United States Patent [19] [11] 4,133,933
Sekine et al. [45] Jan. 9, 1979

[54] ELECTROSENSITIVE RECORDING SHEET WITH SUPPORT CONTAINING CUPROUS IODIDE PARTICLES

[75] Inventors: Yoichi Sekine; Wataru Shimotsuma, both of Hirakata; Shigeru Tsubusaki, Neyagawa, all of Japan

[73] Assignee: Matsushita Electric Industrial Co., Ltd., Osaka, Japan

[21] Appl. No.: 698,361

[22] Filed: Jun. 22, 1976

[30] Foreign Application Priority Data

Jun. 27, 1975 [JP] Japan .................................. 50-80459
Jun. 27, 1975 [JP] Japan .................................. 50-80460

[51] Int. Cl.[2] ........................ B32B 29/04; B32B 27/14; G01D 15/34

[52] U.S. Cl. .................................... 428/328; 428/403; 428/411; 428/477; 428/331; 428/488; 428/538; 428/446; 428/453; 423/32; 423/34; 423/42; 423/493; 427/121; 204/2; 252/501; 252/518; 252/512; 96/1.5 R; 346/135

[58] Field of Search ............... 428/411, 488, 477, 538, 428/328, 446, 403; 204/2; 427/121; 423/32, 34, 42, 493; 252/501, 518, 512; 91/1.5

[56] References Cited

U.S. PATENT DOCUMENTS

| | | | |
|---|---|---|---|
| 2,555,321 | 6/1951 | Dalton et al. | 428/477 X |
| 3,677,816 | 7/1972 | Hayashi et al. | 96/1.5 |
| 3,871,972 | 3/1975 | Sekine | 204/2 |
| 3,898,672 | 8/1975 | Yasumori et al. | 204/2 X |
| 3,905,876 | 9/1975 | Yoshino et al. | 204/2 |

FOREIGN PATENT DOCUMENTS

| | | | |
|---|---|---|---|
| 1211226 | 2/1966 | Fed. Rep. of Germany | 428/488 |
| 1022449 | 3/1966 | United Kingdom | 428/477 |

OTHER PUBLICATIONS

H. Remy, Treatise on Inorg. Chem., 1956, vol. II, pp. 380–381.

*Primary Examiner*—P. C. Ives
*Attorney, Agent, or Firm*—Stevens, Davis, Miller & Mosher

[57] ABSTRACT

An electrosensitive recording sheet consists of an electroconductive material of cuprous iodide, an electrosensitive color forming material, a binder and a support. A color forms in the recording sheet in response to an electric signal when an electric current flows therein. The cuprous iodide is whitened by adding an alkaline substance thereto, so as to only slightly increase the resistance of the cuprous iodide and to increase the contrast of recorded mark and the ordinary appearance of the recording sheet.

27 Claims, 3 Drawing Figures

ELECTROSENSITIVE RECORDING SHEET WITH SUPPORT CONTAINING CUPROUS IODIDE PARTICLES

This invention relates to a white electrosensitive recording sheet having electroconductivity and more particularly to an electrosensitive recording sheet having, as an electroconductive material, cuprous iodide whitened with an alkaline material.

Nowadays, hard copying materials of various systems have been developed and are used in the information industry, different types of performances being required in copying materials used for visibly recording information once it is converted into electric signals. That is, maintenance operations such as pouring of ink and supply of tonor are not required, high speed recording in a dry system is possible, the form of the sheet is close to that of plain paper, contrast of the record is high, etc.

Electrosensitive recording sheets almost satisfy these requirements. The electrosensitive recording sheet has, on a base paper, a recording layer containing a material capable of forming color or changing color by heat energy in response to an electric signal. When an electric current flows between a recording needle electrode, which is allowed to contact the recording sheet and a return electrode, a colored visible image is formed on the recording layer by the heat energy generated around the recording needle electrode.

The inventors have previously disclosed excellent electrosensitive recording sheets using cuprous iodide as an electroconductive material in U.S. Pat. Nos. 3,871,972 and 3,875,023.

Cuprous iodide as an electroconductive material used in an electrosensitive recording sheet is transparent in the form of a thin film and is white or yellowish brown in the form of powders and has a high electroconductivity at room temperature. The conducting mechanism of cuprous iodide at room temperature is due to the P-type semiconductive material having lattice defects of copper as shown in FIG. 1 and the electroconductivity depends on the amount of excess iodine. That is, with an increase in the excess iodine, the lattice defects of copper increase and the electroconductivity increases. On the contrary, when the amount of excess iodine decreases, the electroconductivity decreases. Thus, the electroconductivity depends on the amount of excess iodine while the high electronic conductive cuprous iodide has a yellowish brown color due to the excess iodine. Such coloration of cuprous iodide caused by the high electroconductivity results in loss of the characteristic of white electroconductive material.

As mentioned above, cuprous iodide is suitable as a material for imparting electroconductivity to an electrosensitive recording sheet because it is a white material and still has a high electroconductivity. However, improvement of such recording sheet has been increasingly demanded so that it can maintain its whiteness and have a high electroconductivity with the aspect of plain paper and a high recording contrast.

The first object of this invention is to provide an electrosensitive recording sheet which closely resembles plain paper and is high in recording contrast.

The second object of this invention is to provide an electrosensitive recording sheet which retains its whiteness and further has a high electroconductivity.

Other features and advantages of the invention will be apparent from the following description taken in connection with the accompanying drawings wherein.

As mentioned hereinbefore, if cuprous iodide is used as an electroconductive material the electroconductivity increases with an increase in excess iodine and this excess iodine causes the highly conductive cuprous iodide to become yellowish brown in color.

Figure 2:
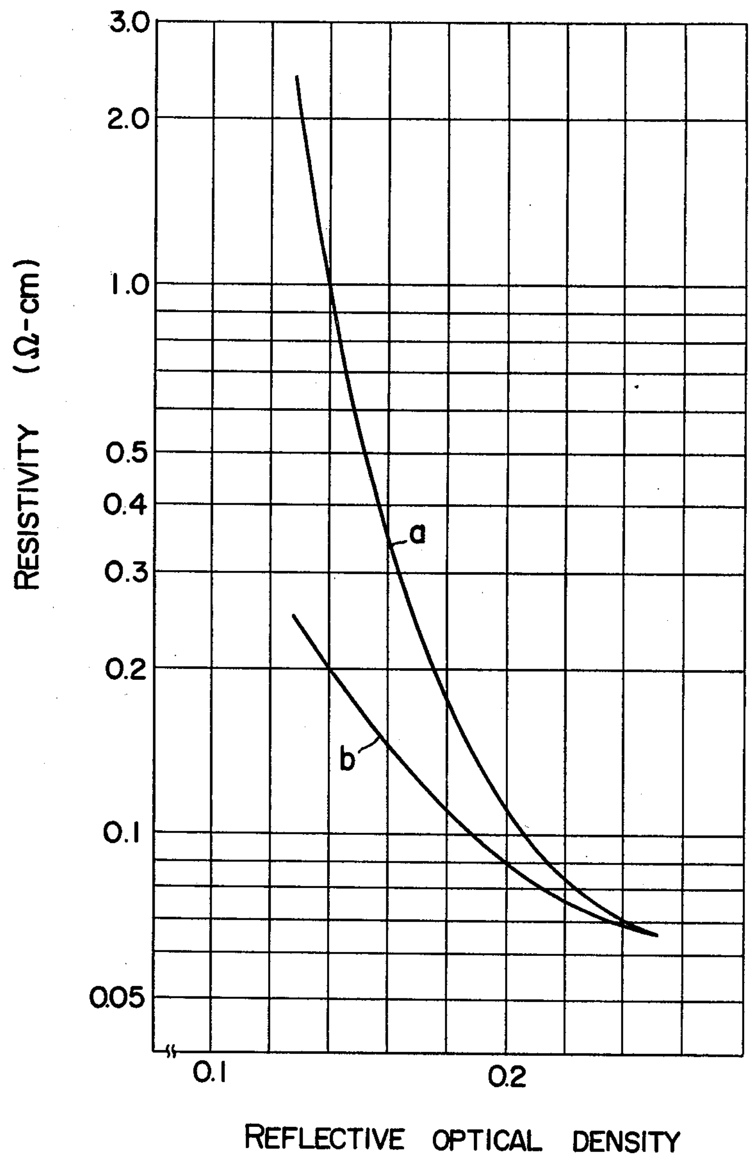
FIG. 2 is a graph which shows the relation between coloring density (reflective optical density) and resistivity of cuprous iodide.

Usually, the electroconductivity of cuprous iodide and the degree of coloration has the relation shown by curve (a) in FIG. 2. In this case, the electroconductivity is expressed by resistivity and the degree of coloration is expressed by reflective optical density which is measured by a Macbeth Reflection Densitometer using a Kodak Wratten No. 106 filter on a sample made by coating the cuprous iodide on a white paper in a coating amount of 20 $g/m^2$. From FIG. 2, it will be recognized that the coloring density increases with a decrease in resistivity that is, an increase in electroconductivity.

In order to remove the coloration of cuprous iodide caused by making it highly electroconductive, the excess iodine must be removed. For this purpose, the inventors proposed the removal of iodine molecules by a reducing agent. According to this method, the reducing agent is allowed to act on excess iodine to convert it into an iodine compound. Thus, the colored cuprous iodide is whitened depending on the amount of the reducing agent. However, the characteristic of cuprous iodide obtained by this method is almost the same as that shown by curve (a) in FIG. 2 and the electroconductivity of the thus whitened cuprous iodide is markedly decreased. The inventors have conducted research in an attempt to whiten cuprous iodide without causing a change in its electroconductivity; that is, to find a method according to which cuprous iodide can be whitened by using an alkaline material which causes substantially no change in the electroconductivity of cuprous iodide. The principle of this whitening method is considered as follows:

The excess iodine present in cuprous iodide somewhat dissolves in water and it is possible to remove the iodine dissolved in water by allowing an alkaline material to act on the dissolved iodine to produce an iodine compound. Since the alkaline material reacts with only a dissociated iodine ion, the direct reaction with an iodine molecule is observed in whitening with a reducing agent does not occur and so there occur no extreme reduction in electroconductivity.

For example, when fine particles of colored cuprous iodide are suspended in water and an alkaline material is added to the suspension, the colored cuprous iodide is instantly whitened. Observation of thus whitened cuprous iodide particles shows that excess iodine remains in the inner part of the particles and only the surface layer is whitened. Therefore, the electroconductivity of cuprous iodide is somewhat decreased but it has a much higher electroconductivity than that whitened with a reducing agent. Curve (b) in FIG. 2 shows the relation between coloring density and resistivity of cuprous iodide whitened by adding an aqueous solution of ammonium carbonate to cuprous iodide particles suspended in water. From FIG. 2, the superiority of this invention will be easily understood.

The amount of the alkaline material added to the cuprous iodide may vary depending on the resistivity of the cuprous iodide before being subjected to the treatment and the degree of dissociation of the alkaline material. If the resistivity of the cuprous iodide before being subjected to the treatment is 0.065 Ω·cm the amount of the alkaline material in terms of the amount of hydroxyl group which contributes to alkalinity is suitably 0.1–5 mols per 100 mols of cuprous iodide.

As mentioned hereinabove, the characteristic of this invention resides in the use of cuprous iodide whitened with an alkaline material as an electroconductive material and examples of the alkaline materials which whiten cuprous iodide are as follows:

Hydroxides: NaOH, KOH, LiOH, $NH_4OH$, $Ca(OH)_2$, $Mg(OH)_2$

Carbonates: $Na_2CO_3$, $K_2CO_3$, $(NH_4)_2CO_3$

Acetates: $CH_3COONa$, $CH_3COOK$, $CH_3COO(NH_4)$

Silicates: sodium silicate (water glass)

Fatty acid salts (carboxylates): sodium stearate, sodium oleate, sodium polyacrylate, ammonium poly-styrene-maleate, sodium alginate.

Figure 1:
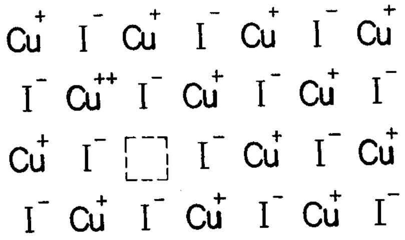
FIG. 1 shows a model of a lattice defect of cuprous iodide used as an electroconductive material in this invention.
Figure 3:
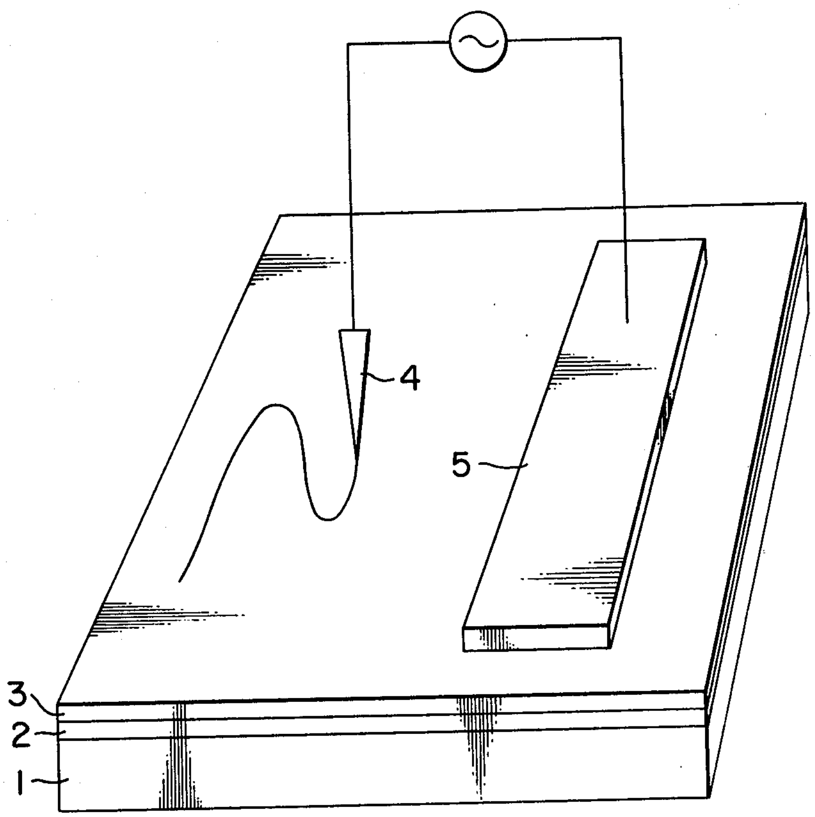
FIG. 3 shows the basic construction of the electrosensitive recording sheet and the manner of recording.

FIG. 3 shows a typical construction of an electrosensitive recording sheet, wherein 1 indicates a support such as paper, plastic film, etc., 2 an electroconductive layer to which the electroconductivity is imparted by dispersing cuprous iodide in a binder, 3 a recording layer having electroconductivity which comprises a binder in which an electrosensitive color forming component and cuprous iodide are dispersed as fine particles, 4 a recording needle electrode and 5 a return electrode both of which contact the recording layer. When an electric current is applied between the electrodes 4 and 5 through the layers 2 and 3 the color forming component around the recording needle forms a color to obtain a recorded image in response to an electric signal. The electrosensitive color forming component is a material which forms a color when an electric current flows through the recording layer and examples of this material are heat sensitive color forming materials or metal oxides. Representatives of the heat sensitive color forming materials which use a two-component system fusing reaction are (i) a combination of leuco bases of triphenylmethane or fluoran dyes and phenolic materials or organic acids, (ii) a combination of metallic soaps and organometallic spot reagent, etc. Representative of the leuco bases of the triphenylmethane dyes is Crystal Violet Lactone, that of the leuco bases of the fluoran dyes is 3-dimethylamino-6-methoxyfluoran, that of the phenolic materials is bisphenol A, that of the organic acids is gallic acid, that of the metallic soaps is ferric stearate and that of organometallic spot reagents is gallic acid. Representative of (iii) one-component system heat sensitive color forming materials is leuco base of oxidation-reduction indicators and specifically Leuco Methylene Blue and Leuco Malachite Green, the materials being excellent.

The metal oxide as the color forming component forms a color by reduction of the metal oxide into a metal due to the electric current. Representative of the metal oxide is zinc oxide.

As mentioned above, various color forming materials may be used in this invention, among which the combination of the leuco bases of the dyes and the phenolic materials is the most effective regarding the characteristics such as contrast of the record, color forming sensitivity, clearness, kind of colors, stability of unrecorded area, etc.

A binder is used for dispersing the color forming material, the electroconductive material, etc. in the form of fine particles in the recording layer or the electroconductive layer and allowing them to maintain binding ability. Examples of the binders ordinarily used are water soluble resins such as hydroxymethyl cellulose, water soluble starch, PVA, styrene-maleic acid copolymer, CMC, etc. It is effective for increasing water resistance of the recording sheet to further add acrylic resin emulsion, SBR latex, etc.

The above example shows the construction comprising a support, an electroconductive layer mainly composed of cuprous iodide provided on the support and an electroconductive recording layer provided on the electroconductive layer. However, even when only the electroconductive recording layer is provided directly on the support, a record can be obtained if the recording voltage is increased. Moreover, even when the electroconductive layer is composed of colored material such as carbon or a metal film, the electroconductive layer is masked with the white cuprous iodide in the recording layer to obtain a record of high contrast.

The following Examples 1 and 2 illustrate the whitening of electroconductive material according to this invention.

EXAMPLE 1

20 mols of cupric sulfate, 20 mols of potassium iodide, and 48 mols of sodium sulfite were dissolved in 100 l of water. The resultant solution was well stirred by a stirring rod to obtain about 20 mols of precipitate of cuprous iodide. This precipitate was repeatedly washed with pure water until the sulfate ion disappeared. The washed precipitate was taken out as a cake containing about 25% by weight of water by centrifuging. Particle size of the precipitate was about 1μ and had a yellowish brown color. A small amount of this cake was placed in a drying oven and dried at 50° C. for 1 hour. The dried cake had a resistivity of 0.07 Ω·cm.

Next, 1.3 kg of this cake was suspended in 500 ml of pure water with sufficient stirring by a stirring rod. Then, 20 g of 10% aqueous solution of caustic soda which was previously prepared was added to the suspension and stirred. The portion of the suspension at which the caustic soda was added first turned deep brown color (probably due to production of NaIO) and then the precipitate was wholly whitened when caustic soda diffused therein by stirring.

Coloring densities of cuprous iodide before and after the addition of caustic soda were compared in the same manner as in FIG. 2. The coloring density before the addition of caustic soda was 0.25 and the coloring density after the addition was 0.15. This difference in the density is such that the change in the color of the cuprous iodide from yellowish brown to white can be clearly recognized by visual observation. The resistivity of this whitened cuprous iodide was 0.18 Ω·cm and had a sufficient electroconductivity.

EXAMPLE 2

1 kg of commercial cuprous iodide powders were pulverized together with 500 g of pure water for 1 hour in a pulverizer using alumina balls to produce a suspension of cuprous iodide, to which 50 g of 20% aqueous solution of ammonium carbonate was added and well stirred.

Coloring densities of cuprous iodide before and after the addition of ammonium carbonate were compared. The density was decreased from 0.20 before the addition to 0.13 after the addition. Furthermore, the resistivity of cuprous iodide changed from 0.09 Ω·cm and thus it was somewhat increased, but the white powders having still a high electroconductivity were obtained.

In the above Examples 1 and 2 the method of whitening cuprous iodide is illustrated. The resultant cuprous iodide can be used in the electroconductive layer or recording layer without subjecting to whitening treatment at preparation of coating material.

Next, the following Example shows production of an electrosensitive recording sheet where cuprous iodide is subjected to whitening treatment at preparation of coating material.

EXAMPLE 3

3 kg of wet cake (water content 26%) of cuprous iodide, 400 g of 20% aqueous solution of styrene-maleic acid copolymer (KN-333 produced by Arakawa Rinsan K.K. pH = 7.21), 200 g of SBR latex (styrenebutadiene rubber latex) (produced by Nihon Geon K.K. solid content 50%) and 100 g of 20% aqueous solution of ammonium carbonate were mixed and the mixture was subjected to dispersing treatment for 1 hour in a pulverizer using glass beads of 5 mm in diameter. The resultant dispersion was a white suspension of pH = 8.4, wherein cuprous iodide was suspended as fine particles of 0.2–0.4$\mu$ in diameter.

This suspension was coated on a white wood free paper by a wire bar adjusted so that coating amount after drying was about 15 g/m$^2$ and this was dried by hot air and hot roll to form an electroconductive layer. The surface resistivity of this electroconductive layer was 2.1 KΩ. The reflective optical density of this electroconductive layer measured by a Macbeth Reflection Densitometer using a Kodak Wratten No. 106 filter was 0.12. Since the reflective optical density of the white wood free paper is 0.11, it will be understood that the electroconductive layer had a very high whiteness and was close to a plain paper.

Next, a dispersion was prepared in the same manner as mentioned above except that ammonium carbonate was omitted, and an electroconductive layer was formed. This layer had a surface resistivity of 1.4 KΩ and a reflective optical density of 0.16 and had yellowish brown color. This color tone is a cunspicuous color and gives an unnatural image. Therefore, this paper is unsuitable as a recording sheet.

Next, 500 g of bisphenol A, 100 g of 20% aqueous solution of styrene-maleic acid copolymer and 2000 g of water were pulverized and mixed for 2 hours using alumina balls of 5 mm in diameter in the same manner as in the preparation of the cuprous iodide dispersion to obtain a dispersion of color forming material. Separately, 70 g of Crystal Violet Lactone, 70 g of 20% aqueous solution of styrene-maleic acid copolymer, 50 g of 5% aqueous solution of polyvinyl alcohol and 300 g of water were pulverized and mixed for 1 hour in the same manner as mentioned above to prepare a dye dispersion. Then, 25 parts of the cuprous iodide dispersion, 25 parts of the dye dispersion, 100 parts of the dispersion of color forming material, 20 parts of SBR latex and 10 parts of a wax dispersion (Repol-50 produced by Daikyo Kagaku K.K.) were mixed and the resultant mixed dispersion was coated on the white electroconductive layer and the yellowish brown electroconductive layer by a wire bar adjusted so that the coating amount after drying was 4 g/m$^2$. These were dried to form recording layers to obtain recording sheets. The recording sheet produced by forming the recording layer on the white electroconductive layer had a surface resistivity of 2.8 KΩ and an optical reflective density of the base of 0.14. On the other hand, the recording sheet produced using the yellowish brown electroconductive layer had a surface resistivity of 2.2 KΩ and an optical reflective density of the base of 0.21 and coloration was clearly recognized. These electrosensitive recording sheets were subjected to recording test at a scanning speed of 0.87 m/s and 500 Vpp (A.C.) to obtain clear blue recording mark of 1.14–1.16 in reflective optical density on both recording sheets. However, the electrosensitive recording sheet which used the white electroconductive layer was higher in contrast and in clearness than that which used the yellowish brown electroconductive layer and the former was closer to a plain paper and formed high quality images.

What is claimed is:

1. An electrosensitive recording sheet having, on a support of paper or plastic film, an electroconductive layer which contains cuprous iodide particles having an excess amount of iodine, wherein the cuprous iodide particles have been whitened by removing iodine existing on the surface of the cuprous iodide particles using an aqueous alkaline material.

2. An electrosensitive recording sheet having, on a support of paper or plastic film, an electroconductive recording layer which contains
cuprous iodide particles having an excess amount of iodine, wherein the cuprous iodide particles have been whitened by removing iodine existing on the surface of the cuprous iodide particles using an aqueous alkaline material.

3. An electrosensitive recording sheet according to claim 2, the support comprises an insulating sheet and an electroconductive layer thereon.

4. An electrosensitive recording sheet according to claim 3, wherein the electroconductive layer comprises cuprous iodide and a binder.

5. An electrosensitive recording sheet according to claim 4, wherein cuprous iodide is whitened with an alkaline material.

6. An electrosensitive recording sheet according to claim 1, wherein the alkaline material is a carbonate of an alkali metal, an alkaline earth metal or ammonia.

7. An electrosensitive recording sheet according to claim 1, wherein the alkaline material is an acetate of an alkali metal, an alkaline earth metal or ammonia.

8. An electrosensitive recording sheet according to claim 1, wherein the alkaline material is an alkali metal salt or ammonium salt of a carboxylic acid.

9. An electrosensitive recording sheet according to claim 1, wherein the alkaline material is an alkali metal salt of silicic acid.

10. An electrosensitive recording sheet according to claim 1, wherein the alkaline material is a hydroxide of ammonia or a metal.

11. An electrosensitive recording sheet according to claim 2, wherein the color forming material is a heat sensitive color forming material.

12. An electrosensitive recording sheet according to claim 2, wherein the color forming material is a metal oxide.

13. An electrosensitive recording sheet according to claim 11, wherein the heat sensitive color forming material is a combination of a leuco base of triphenylmethane or fluoran dye and a phenolic material or an organic acid.

14. An electrosensitive recording sheet according to claim 5, wherein the alkaline material is a carbonate of an alkali metal, an alkaline earth metal or ammonia.

15. A method for whitening cuprous iodide particles having an excess amount of iodine which comprises adding an alkaline material to an aqueous dispersion of cuprous iodide particles to remove iodine existing on the surface of the cuprous iodide particles.

16. A method for whitening cuprous iodide according to claim 15, wherein the alkaline material is a carbonate of an alkali metal, an alkaline earth metal or ammonia.

17. A method for whitening cuprous iodide according to claim 15, wherein the alkaline material is an acetate of an alkali metal, an alkaline earth metal or ammonia.

18. A method for whitening cuprous iodide according to claim 15, wherein the alkaline material is an alkali metal salt or ammonium salt of a carboxylic acid.

19. A method for whitening cuprous iodide according to claim 15, wherein the alkaline material is an alkali metal salt of silicic acid.

20. A method for whitening cuprous iodide according to claim 15, wherein the alkaline material is a hydroxide of ammonia or a metal.

21. A method for whitening cuprous iodide according to claim 15, wherein the amount of the alkaline material added is 0.1–5 mols in terms of the amount of hydroxyl ion per 100 mols of cuprous iodide.

22. An electrosensitive recording sheet according to claim 2, wherein the alkaline material is a carbonate of an alkali metal, an alkaline earth metal or ammonia.

23. An electrosensitive recording sheet according to claim 2, wherein the alkaline material is an acetate of an alkali metal, an alkaline earth metal or ammonia.

24. An electrosensitive recording sheet according to claim 2, wherein the alkaline material is an alkali metal salt or ammonium salt of a carboxylic acid.

25. An electrosensitive recording sheet according to claim 2, wherein the alkaline material is an alkali metal salt of silicic acid.

26. An electrosensitive recording sheet according to claim 2, wherein the alkaline material is a hydroxide of ammonia or a metal.

27. A method of whitening an electrosensitive recording sheet containing cuprous iodide particles having an excess amount of iodine, by removing iodine existing on the surface of the cuprous iodide particles by applying an alkaline material thereto.

* * * * *